US008777712B2

(12) United States Patent
Baerlocher

(10) Patent No.: US 8,777,712 B2

(45) **Date of Patent: *Jul. 15, 2014**

(54) GAMING DEVICE HAVING AN AWARD LEVEL DETERMINATION COMPETITION

(75) Inventor: Anthony J. Baerlocher, Reno, NV (US)

(73) Assignee: IGT, Las Vegas, NV (US)

( * ) Notice: Subject to any disclaimer, the term of this patent is extended or adjusted under 35 U.S.C. 154(b) by 1499 days.

This patent is subject to a terminal disclaimer.

(21) Appl. No.: 11/724,925

(22) Filed: Mar. 15, 2007

(65) Prior Publication Data

US 2007/0184894 A1 Aug. 9, 2007

Related U.S. Application Data

(63) Continuation of application No. 10/241,325, filed on Sep. 11, 2002, now Pat. No. 7,192,344, which is a continuation-in-part of application No. 10/163,805, filed on Jun. 5, 2002, now Pat. No. 7,037,192, which is a continuation of application No. 09/772,763, filed on Jan. 30, 2001, now Pat. No. 6,425,824.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.

USPC .................... 463/16; 463/20; 463/25; 463/42

(58) Field of Classification Search

USPC ........................................ 463/16, 20, 25, 42

See application file for complete search history.

(56) References Cited

U.S. PATENT DOCUMENTS

| | | | |
|---|---|---|---|
| 3,048,402 | A | 8/1962 | Schaper |
| 4,327,919 | A | 5/1982 | Vennor |

(Continued)

FOREIGN PATENT DOCUMENTS

| | | |
|---|---|---|
| EP | 0 281 402 | 9/1988 |
| EP | 0 945 837 | 9/1999 |

(Continued)

OTHER PUBLICATIONS

Double Up Poker Game Description written by IGT, available prior to 2000.

(Continued)

*Primary Examiner* — Arthur O Hall

*Assistant Examiner* — Wei Lee

(74) *Attorney, Agent, or Firm* — Neal, Gerber & Eisenberg LLP

(57) ABSTRACT

A gaming device including a game having a plurality of different award levels. In one embodiment, the gaming device displays a plurality of ranked components. The gaming device determines and reveals a first and second component to a player. The gaming device improves one of the award levels when the rank of the first component is more favorable than the rank of the second component. In another embodiment, the gaming device displays a plurality of components and a plurality of selections, wherein one of the components is associated with each of the selections. The player picks and reveals a first component associated with one of the selections. The processor picks and reveals a second component associated with another of the selections. The processor improves the award level for the player in the game when the rank of the first component is more favorable than the rank of the second component.

48 Claims, 18 Drawing Sheets

(56) References Cited

U.S. PATENT DOCUMENTS

| | | | | |
|---|---|---|---|---|
| 4,488,727 | A | 12/1984 | Lam | |
| 4,593,904 | A | 6/1986 | Graves | |
| 4,624,459 | A | 11/1986 | Kaufman | |
| 4,695,053 | A | 9/1987 | Vazquez, Jr. et al. | |
| 4,836,546 | A | 6/1989 | DiRe et al. | |
| 5,034,807 | A | 7/1991 | Von Kohorn | |
| 5,072,946 | A | 12/1991 | Miller | |
| 5,092,598 | A | 3/1992 | Kamille | |
| 5,154,420 | A | 10/1992 | Gutnrecht | |
| 5,324,041 | A | 6/1994 | Boylan et al. | |
| 5,342,047 | A | 8/1994 | Heidel et al. | |
| 5,407,200 | A | 4/1995 | Zalabak | |
| 5,524,888 | A | 6/1996 | Heidel | |
| 5,605,504 | A * | 2/1997 | Huang | 463/22 |
| 5,671,921 | A | 9/1997 | Quinlan | |
| 5,779,549 | A * | 7/1998 | Walker et al. | 463/42 |
| 5,855,514 | A | 1/1999 | Kamille | |
| 5,890,962 | A | 4/1999 | Takemoto | |
| 5,931,467 | A | 8/1999 | Kamille | |
| 5,944,314 | A | 8/1999 | Stavinsky | |
| 5,951,397 | A | 9/1999 | Dickinson | |
| 5,988,643 | A | 11/1999 | Awada | |
| 5,996,997 | A | 12/1999 | Kamille | |
| 5,997,401 | A | 12/1999 | Crawford | |
| 6,004,207 | A | 12/1999 | Wilson | |
| 6,015,346 | A | 1/2000 | Bennett | |
| 6,033,307 | A | 3/2000 | Vancura | |
| 6,059,289 | A | 5/2000 | Vancura | |
| 6,068,553 | A | 5/2000 | Parker | |
| 6,089,976 | A | 7/2000 | Schneider et al. | |
| 6,102,798 | A | 8/2000 | Bennett | |
| 6,126,542 | A | 10/2000 | Fier | |
| 6,135,882 | A | 10/2000 | Kadlic | |
| 6,142,874 | A | 11/2000 | Kodachi et al. | |
| 6,142,875 | A | 11/2000 | Kodachi et al. | |
| 6,146,271 | A | 11/2000 | Kudlic | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,164,652 | A | 12/2000 | Lauretta et al. | |
| 6,168,523 | B1 | 1/2001 | Piechowiak et al. | |
| 6,174,235 | B1 | 1/2001 | Walker et al. | |
| 6,190,255 | B1 | 2/2001 | Thomas et al. | |
| 6,193,606 | B1 | 2/2001 | Walker et al. | |
| 6,203,429 | B1 | 3/2001 | Demar et al. | |
| 6,210,279 | B1 | 4/2001 | Dickinson | |
| 6,224,483 | B1 | 5/2001 | Mayeroff | |
| 6,227,969 | B1 | 5/2001 | Yoseloff | |
| 6,231,442 | B1 | 5/2001 | Mayeroff | |
| 6,234,897 | B1 * | 5/2001 | Frohm et al. | 463/20 |
| 6,237,913 | B1 | 5/2001 | Kamille | |
| 6,261,177 | B1 | 7/2001 | Bennett | |
| 6,296,568 | B1 | 10/2001 | Tracy | |
| 6,305,686 | B1 | 10/2001 | Perrie et al. | |
| 6,328,649 | B1 | 12/2001 | Randall et al. | |
| 6,375,187 | B1 | 4/2002 | Baerlocher | |
| D457,571 | S | 5/2002 | Edwards, Jr. | |
| 6,390,473 | B1 | 5/2002 | Vancura et al. | |
| 6,394,899 | B1 | 5/2002 | Walker | |
| 6,398,220 | B1 | 6/2002 | Inoue | |
| 6,406,369 | B1 | 6/2002 | Baerlocher et al. | |
| 6,425,824 | B1 | 7/2002 | Baerlocher et al. | |
| 6,435,511 | B1 | 8/2002 | Vancura et al. | |
| 6,443,837 | B1 * | 9/2002 | Jaffe et al. | 463/16 |
| 6,514,141 | B1 | 2/2003 | Kaminkow et al. | |
| 6,575,466 | B1 * | 6/2003 | Lizak | 273/292 |
| 6,599,192 | B1 | 7/2003 | Baerlocher et al. | |
| 6,602,135 | B1 | 8/2003 | Gerrard | |
| 6,632,139 | B1 | 10/2003 | Baerlocher | |
| 6,632,141 | B2 | 10/2003 | Webb et al. | |
| 6,648,754 | B2 | 11/2003 | Baerlocher et al. | |
| 6,692,005 | B2 | 2/2004 | Vancura et al. | |
| 6,719,632 | B2 | 4/2004 | Palmer et al. | |
| 6,722,981 | B2 | 4/2004 | Kaminkow et al. | |
| 6,722,982 | B2 | 4/2004 | Kaminkow et al. | |
| 6,758,750 | B2 | 7/2004 | Baerlocher et al. | |
| 6,776,711 | B1 | 8/2004 | Baerlocher | |
| 6,793,579 | B2 | 9/2004 | Baerlocher et al. | |
| 6,796,905 | B2 | 9/2004 | Baerlocher et al. | |
| 6,808,452 | B2 | 10/2004 | Baerlocher et al. | |
| 6,811,483 | B1 | 11/2004 | Webb et al. | |
| 6,852,030 | B2 | 2/2005 | Baerlocher et al. | |
| 6,863,606 | B1 | 3/2005 | Berg et al. | |
| 6,899,623 | B2 | 5/2005 | Baerlocher | |
| 6,988,732 | B2 | 1/2006 | Vancura | |
| 7,073,793 | B2 | 7/2006 | Vancura | |
| 7,192,344 | B2 | 3/2007 | Baerlocher | |
| 7,192,346 | B2 | 3/2007 | Mathis | |
| 7,235,010 | B2 | 6/2007 | Baerlocher | |
| 7,360,764 | B2 | 4/2008 | Vancura et al. | |
| 7,533,885 | B2 | 5/2009 | Nicely et al. | |
| 7,556,267 | B2 | 7/2009 | Vancura et al. | |
| 7,572,182 | B2 | 8/2009 | Vancura | |
| 7,658,673 | B2 | 2/2010 | Baerlocher et al. | |
| 7,727,072 | B2 | 6/2010 | Crowder, Jr. et al. | |
| 7,803,044 | B2 | 9/2010 | Baerlocher et al. | |
| 7,811,168 | B2 | 10/2010 | Parham et al. | |
| 7,942,737 | B2 | 5/2011 | Cregan et al. | |
| 7,967,292 | B2 | 6/2011 | Katz et al. | |
| 8,079,903 | B2 | 12/2011 | Nicely et al. | |
| 8,113,947 | B2 | 2/2012 | Hornik et al. | |
| 2001/0034259 | A1 * | 10/2001 | Luciano et al. | 463/16 |
| 2001/0040341 | A1 | 11/2001 | Kamille | |
| 2002/0025846 | A1 * | 2/2002 | Bennett et al. | 463/20 |
| 2002/0042740 | A1 | 4/2002 | Matsuoka | |
| 2002/0043759 | A1 | 4/2002 | Vancura | |
| 2002/0103020 | A1 | 8/2002 | Baerlocher et al. | |
| 2003/0040357 | A1 | 2/2003 | Baerlocher | |
| 2003/0060281 | A1 | 3/2003 | Vancura | |
| 2003/0071416 | A1 | 4/2003 | Vancura | |
| 2003/0104852 | A1 | 6/2003 | Duhamel | |
| 2003/0193139 | A1 | 10/2003 | Vancura | |
| 2004/0036216 | A1 | 2/2004 | Vancura | |
| 2004/0067790 | A1 | 4/2004 | Peterson et al. | |
| 2005/0101375 | A1 | 5/2005 | Webb et al. | |
| 2005/0130729 | A1 | 6/2005 | Baerlocher et al. | |
| 2005/0187010 | A1 | 8/2005 | Baerlocher | |
| 2007/0167230 | A1 | 7/2007 | Baerlocher | |
| 2008/0032785 | A1 | 2/2008 | Crowder, Jr. et al. | |
| 2009/0118002 | A1 | 5/2009 | Lyons et al. | |
| 2009/0264193 | A1 | 10/2009 | Vancura et al. | |
| 2010/0041458 | A1 | 2/2010 | Katz et al. | |

FOREIGN PATENT DOCUMENTS

| | | | |
|---|---|---|---|
| GB | 2105891 | | 3/1983 |
| GB | 2 222 712 | | 3/1990 |
| JP | 7-185126 | | 7/1995 |
| JP | 08155134 | A | 6/1996 |
| JP | 10048363 | A | 2/1998 |
| JP | 2000-14933 | | 1/2000 |
| JP | 2000-245959 | | 9/2000 |
| JP | 2000-254350 | | 9/2000 |
| JP | 2000245949 | A | 9/2000 |
| KR | 2001066723 | | 7/2001 |
| WO | WO 82/01611 | | 5/1982 |
| WO | WO 98/60207 | | 1/1998 |
| WO | WO 00/12186 | | 3/2000 |
| WO | WO 02/32523 | | 4/2002 |

OTHER PUBLICATIONS

In Between Game Description, IGT, available prior to 2000.

Janken-8 II Brochure written by Hsin Chen Wen Enterprises Co., Ltd., published prior to 2000.

(56) References Cited

OTHER PUBLICATIONS

Polly & Roger Brochure written by VLC, Inc., published in 2000.
Roulette Description, Gaming Guide Peppermill Hotel, available prior to 2000.
Run for Your Money Brochure, IGT, 1998.
Top Gear Brochure written by Aristocrat Leisure Industries Pty. Ltd, published Sep. 1995.
Office Action dated May 27, 2011, in related U.S. Appl. No. 11/724,920 (28 pages).
Office Action for related U.S. Appl. No. 11/724,920, dated Oct. 27, 2011 (11 pages).

* cited by examiner

GAMING DEVICE HAVING AN AWARD LEVEL DETERMINATION COMPETITION

PRIORITY DOCUMENT

This application is a continuation of, claims priority to and the benefit of U.S. patent application Ser. No. 10/241,325, filed Sep. 11, 2002, which is a continuation-in-part of, claims priority to and the benefit of U.S. patent application Ser. No. 10/163,805, filed on Jun. 5, 2002, which is a continuation of, claims priority to and the benefit of U.S. patent application Ser. No. 09/772,763, filed Jan. 30, 2001, now U.S. Pat. No. 6,425,824 B1, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Providing a game in which a player has an opportunity to win potentially large awards or credits is one way to enhance player enjoyment and excitement.

Currently, gaming machines or devices provide games wherein a player has one or more opportunities to obtain a winning symbol combination on mechanical or video reels. The winning symbol combination may be along the same payline or on different paylines (known as a scatter pay). By providing gaming devices with more winning symbol combinations, players' have more opportunities to receive an award.

Additionally, known gaming devices include games having several award levels. Generally, the awards in these games increase as the award levels in the game increase. Therefore, as a player progresses in one of these games, the award levels and the associated awards increase in the game.

Gaming devices that increase the awards and provide large awards are desirable. Therefore, to increase player enjoyment and excitement, it is desirable to provide new games and gaming devices which increase the award levels in a game to provide greater award values and larger awards to players in the game.

SUMMARY

The present invention is directed to a gaming device including a game and specifically, to a gaming device including a game having a plurality of different award levels and a competition to determine or increase the award level in the game or in a subsequent game.

In one embodiment of the present invention, the gaming device initiates a competition mode or competition associated with a game when a triggering event occurs in the game. The gaming device displays a plurality of ranked components to a player. The gaming device determines and reveals a first and second component from the plurality of ranked components. The components may be randomly determined, predetermined, determined based on a player's wager in the game or according to any other suitable method. The gaming device advances the award level in a subsequent game when the rank of the first component is more favorable than the rank of the second component in the competition. It should be appreciated that the components may include symbols, characters, words, phrases, numbers, card hand types (i.e., full house, straight, flush) or any other suitable component. It should also be appreciated that the components may be ranked according to award values, credit values or any suitable criteria desired by the game implementor.

In another embodiment of the present invention, the gaming device displays a plurality of ranked components to a player in the competition. Additionally, the gaming device displays at least two selections to the player wherein one of the ranked components is randomly associated with each of the selections. The player picks one of the selections to reveal a first component associated with the picked selection. The gaming device picks and reveals a second component associated with one of the unpicked selections. The gaming device advances the award level in the game or in a subsequent game when the rank of the first component is more favorable than the rank of the second component. The subsequent game may be a bonus game, sub-game, another competition or any suitable game or game event.

In one aspect of this embodiment, the gaming device advances the award level by increasing the award level by a predetermined amount. In another aspect of this embodiment, the gaming device advances the award level by increasing the award level by a randomly determined amount. In a further aspect of this embodiment, the gaming device advances the award level by increasing the award level based on a wager made by a player. It should be appreciated that the award level may be advanced by increasing the award level, changing the symbols associated with each of the award levels, changing the award associated with each of the award levels or advancing the award levels according to any suitable method.

In another embodiment, the award levels are associated with a plurality of award pools or groups wherein each of the award groups includes a plurality of different awards. In one embodiment, the average values of the awards in the award groups are different. In another embodiment, the median of the awards in the award groups are different. In a further embodiment, the values of the awards in at least one of the award groups are multiples of the values of the awards in at least one of the other award groups. The gaming device improves the award level in a subsequent game or games based on the awards in the associated award groups.

In one embodiment, the gaming device displays a query display such as a statement or question to the player and at least two selections associated with the statement or question. The ranked components include outcomes such as answers to the question displayed in the query display, where one of the outcomes is associated with each of the selections. The outcomes or answers are ranked based on which answers are the most popular or most likely answers to the question (i.e., prompt). The player picks the selection including the outcome or answer, which the player believes is the best answer or the answer having the most favorable ranking answer of all of the answers. The gaming device then reveals the component associated with the selection picked by the player. The gaming device also selects and reveals one of the components associated with the unpicked selection or selections. The gaming device advances the award level in the game when the rank of the component (i.e., answer) associated with the player's picked selection is more favorable than the rank of the component (i.e., answer) associated with the selection picked by the processor.

In one embodiment, an award is associated with each of the components. The gaming device provides the award to the player when the rank of the component associated with the picked selection is more favorable than any other rank of the components associated with the remaining selection or selections in the game. It should be appreciated that the award may be any suitable award and that one or more awards may be associated with the components in a game.

In another embodiment, the gaming device displays a plurality of ranked components and at least two selections to a player, where one of the components is associated with each of the selections. In addition, an award level is associated with each of the components. In this embodiment, the gaming device enables the player to pick one of the selections to reveal the component and the award level associated with that selection. The gaming device then provides the award level and the component associated with the picked selection to the player when the rank of the component associated with the picked selection is more favorable than the ranks of the components associated with any of the unpicked selections.

In a further embodiment, the gaming device displays a plurality of ranked components and a plurality of selections where one of the components is associated with each of the selections. In this embodiment, a player competes to obtain an advanced award level in a subsequent game. The gaming device enables the player to pick one of the selections as described above. The gaming device advances the award level in the subsequent game when the player picks and reveals the component having the most favorable ranking. In one embodiment, the player also receives an award for selecting the component having the most favorable ranking. In another embodiment, the player receives an award associated with any of the components revealed by a selection picked by the player. However, the player only receives the advanced award level in the game when the rank associated with the component picked by the player is the most favorable rank of all of the components.

In a further embodiment, the gaming device advances the award level in a subsequent game based on the relationship between the component associated with the selection picked by the player and the component associated with the selection picked by the processor. In this embodiment, the gaming device advances the award level in the subsequent game based on the difference between the rankings of the components associated with the picked selections. For example, if a player picks a component having a ranking that is three ranks greater or higher than the ranking of the component associated with the selections picked by the processor, the gaming device advances the award level by three in the subsequent game. If the difference was two, the gaming device advances the award level by two. If the ranking of the player's component is less than the processor's component, the award level preferably does not change.

In another embodiment, the gaming device decreases or reduces the award level in a subsequent game when the rank of the component associated with the selection picked by the player is less favorable than the rank of the component picked by the processor. The award level may be reduced by a predetermined amount, randomly determined amount, based on the difference between the ranks or according to any other suitable method.

In a further embodiment, two or more players compete to pick the selection which reveals the higher ranking component in a game. In one embodiment, the number of components is equal to or greater than the number of players in the competition. In another embodiment, the number of selections is equal to or greater that the number of players in the competition. In one embodiment, each player picks one selection from a plurality of selections, where one of the ranked components is associated with each of the selections. The gaming device advances the award level for the player that picks the selection that reveals the higher ranking component. In one aspect of this embodiment, the gaming device reveals the components associated with the selections picked by the players as each player picks one of the selections. In another aspect of this embodiment, the gaming device enables all the players in the competition to pick one of the selections and then reveals the components associated with the picked selections based on a designated order such as revealing the lowest ranking component first, and each subsequent lowest ranking component until the highest ranking component is revealed. Revealing the components according to a designated order increases the players' excitement and enjoyment in the competition.

It should be appreciated that the competition mode or competition may be initiated based on a triggering event in a primary game or base game, a secondary game or bonus game, a sub-game, a competition or any other suitable game.

It is therefore an advantage of the present invention to provide a gaming device that enables a player to increase the award level in a game.

Another advantage of the present invention is to provide a gaming device that increases the awards in a game.

It is a further advantage of the present invention to provide a gaming device that enables one or more players to compete in a game.

Other objects, features and advantages of the invention will be apparent from the following detailed disclosure, taken in conjunction with the accompanying sheets of drawings, wherein like numerals refer to like parts, elements, components, steps and processes.

Additional features and advantages are described herein, and will be apparent from, the following Detailed Description and the figures.

DETAILED DESCRIPTION

Figure 1A:
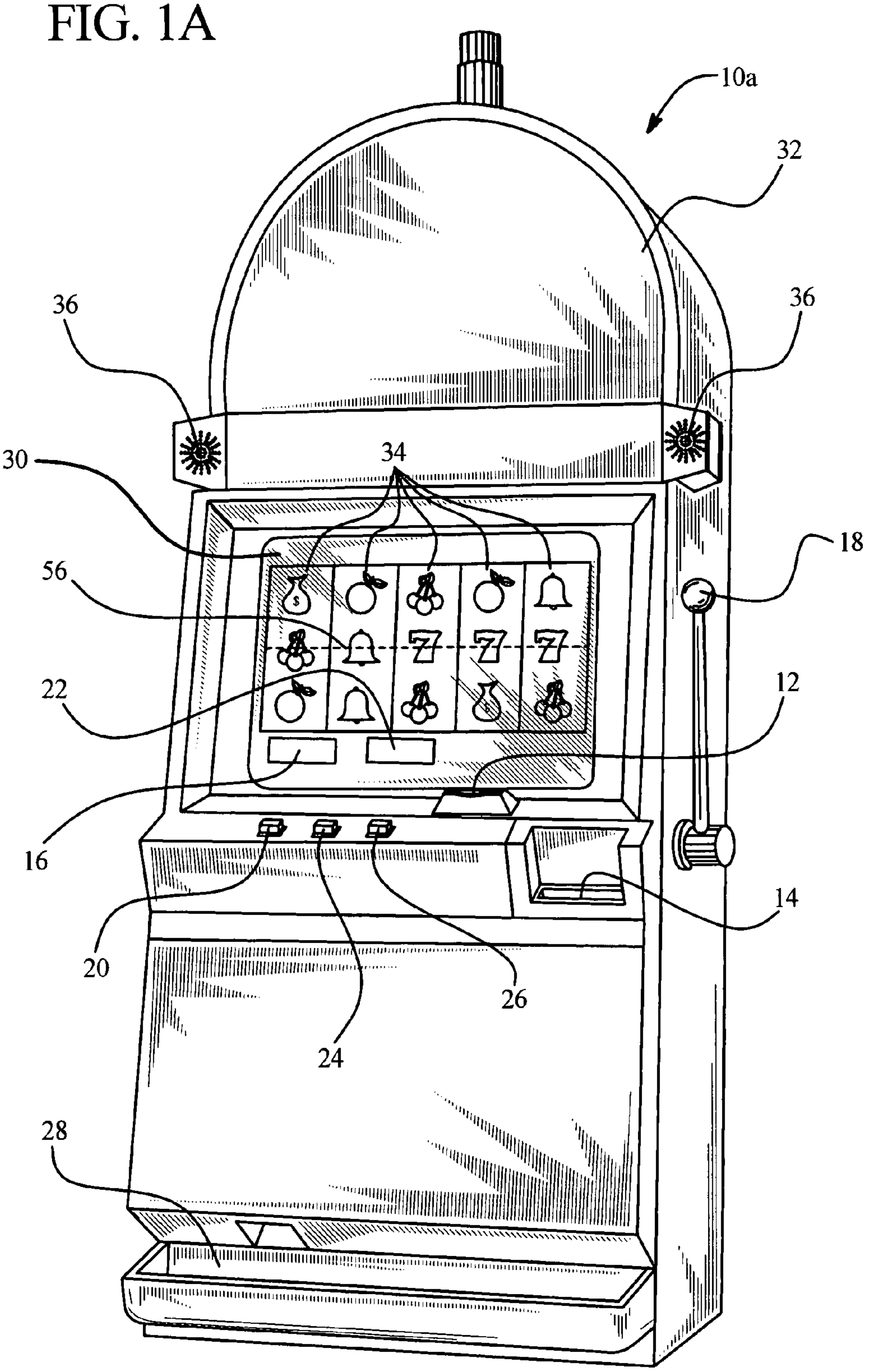
FIG. 1A is a front perspective view of one embodiment of the gaming device of the present invention.
Figure 1B:
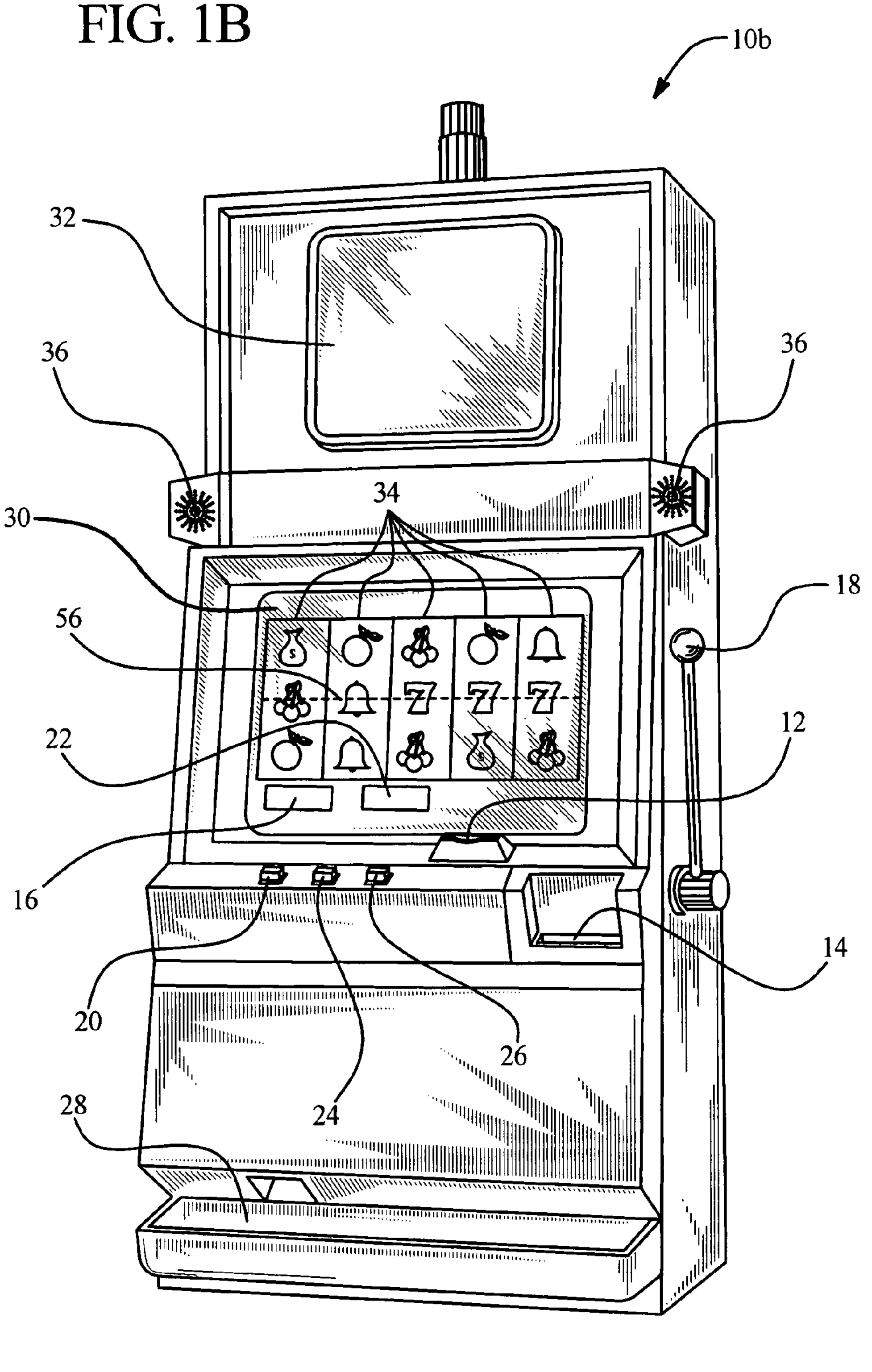
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, black jack, poker or keno, any of the bonus triggering events and any of the bonus round games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
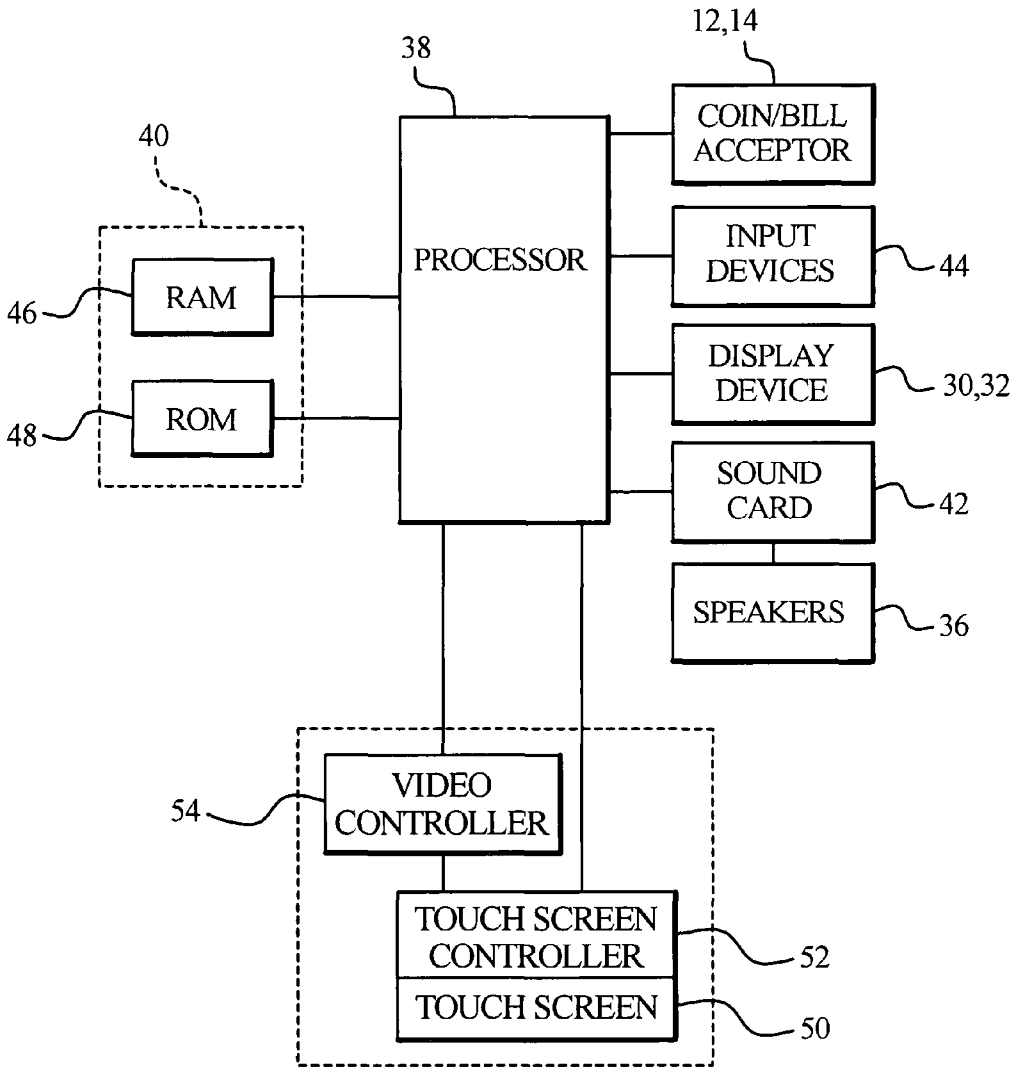
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically initiate a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on one or more of a plurality of the reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Award Level Determination Competition

Figure 3:
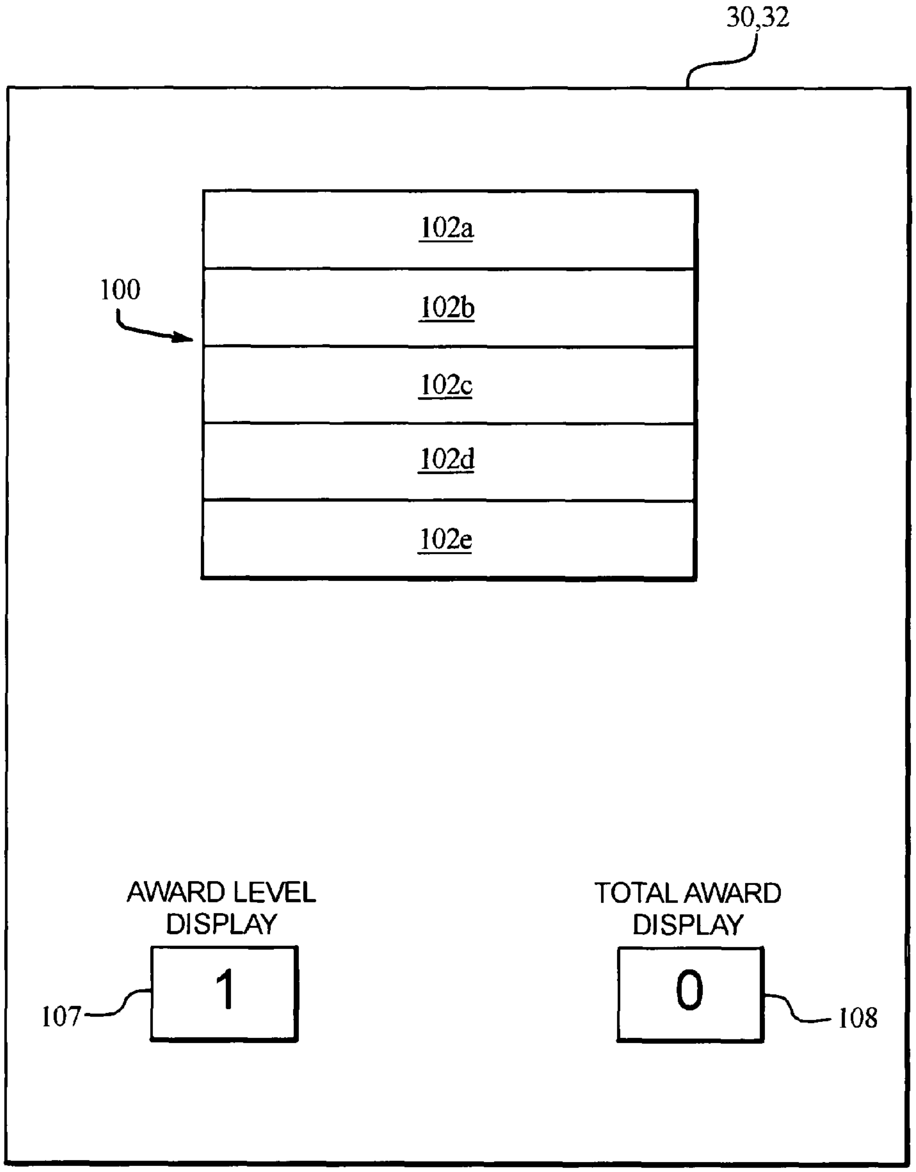
FIG. 3 is an enlarged elevation view of one embodiment of the present invention.

Referring to FIG. 3, one embodiment of the present invention is illustrated where a player enters a competition mode or competition from a game such as a primary game, secondary game or other suitable game to advance the award level in a subsequent game or games. In this embodiment, the gaming device initiates the competition and displays a plurality of ranked components 102*a*, 102*b*, 102*c*, 102*d* and 102*e* to a player in a game when a triggering event occurs in the game. The triggering event may be any suitable triggering event such as a particular symbol or symbol combination appearing on a set of reels. The gaming device then determines and reveals a first component or player's component and a second component or a non-player's component from the plurality of components. The first and second components may be randomly determined, pre-determined, determined based on a player's wager in the game or according to any suitable method. The gaming device compares the ranks of the revealed components and advances the award level in a subsequent game or games when the rank associated with the first component is more favorable than the rank associated with the second component. It should be appreciated that the gaming device may advance the award level when the rank associated with the second component is more favorable than the rank associated with the first component.

In FIG. 3, the gaming device displays a plurality of ranked components, 102*a*, 102*b*, 102*c*, 102*d*, and 102*e* on a display such as a component display 100, to a player in the competition or competition game. The components are ranked based on a designated characteristic or criteria such as values, credit values, award values, card hand types (i.e., full house, straight, flush) or any other suitable criteria. In this embodiment, component 102*a* has the most favorable ranking and the ranking of the components 102*b*, 102*c* and 102*d* decrease in descending order to component 102*e*, which has the least favorable ranking. Initially, the components are masked or hidden from the player. In this embodiment, the gaming device displays five components, 102*a*, 102*b*, 102*c*, 102*d*, and 102*e*, however, the number of components displayed in a game may be any suitable number of components. In addition, an award level display 107 indicates the present award level in a game. A total award display 108 indicates the total of any awards accumulated by a player in the game or games.

In a game such as a primary game, the gaming device (i.e., the processor) initiates a competition upon the occurrence of a triggering event in the primary game. The triggering event may be any suitable triggering event as described above. In the competition, the gaming device determines and reveals a first and second component from the plurality of ranked components. The gaming device may provide the first or the second component to the player. In this game, the gaming device provides the first component to the player. The gaming device compares the ranks associated with the first and second components and improves the award level in the game when the rank of the first component (i.e, the player's component) is more favorable than the rank of the second component. In one embodiment, a plurality of awards are associated with the components such that the gaming device provides the award associated with the first component to the player when the rank of the first component is more favorable than the rank of the second component. It should be appreciated that the awards associated with the components may be multipliers, values, credits or any suitable awards.

Figure 4A:
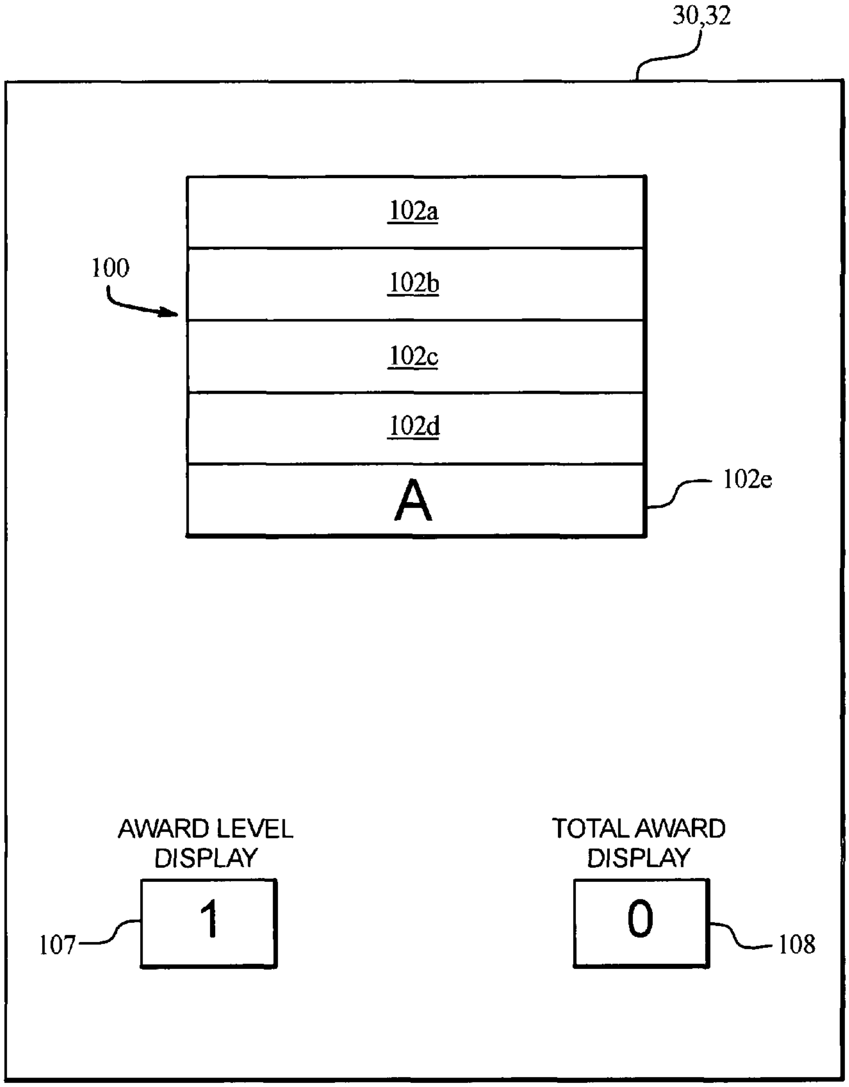
FIGS. 4A and 4B are enlarged elevation views of an example of the embodiment of FIG. 3.
Figure 4B:
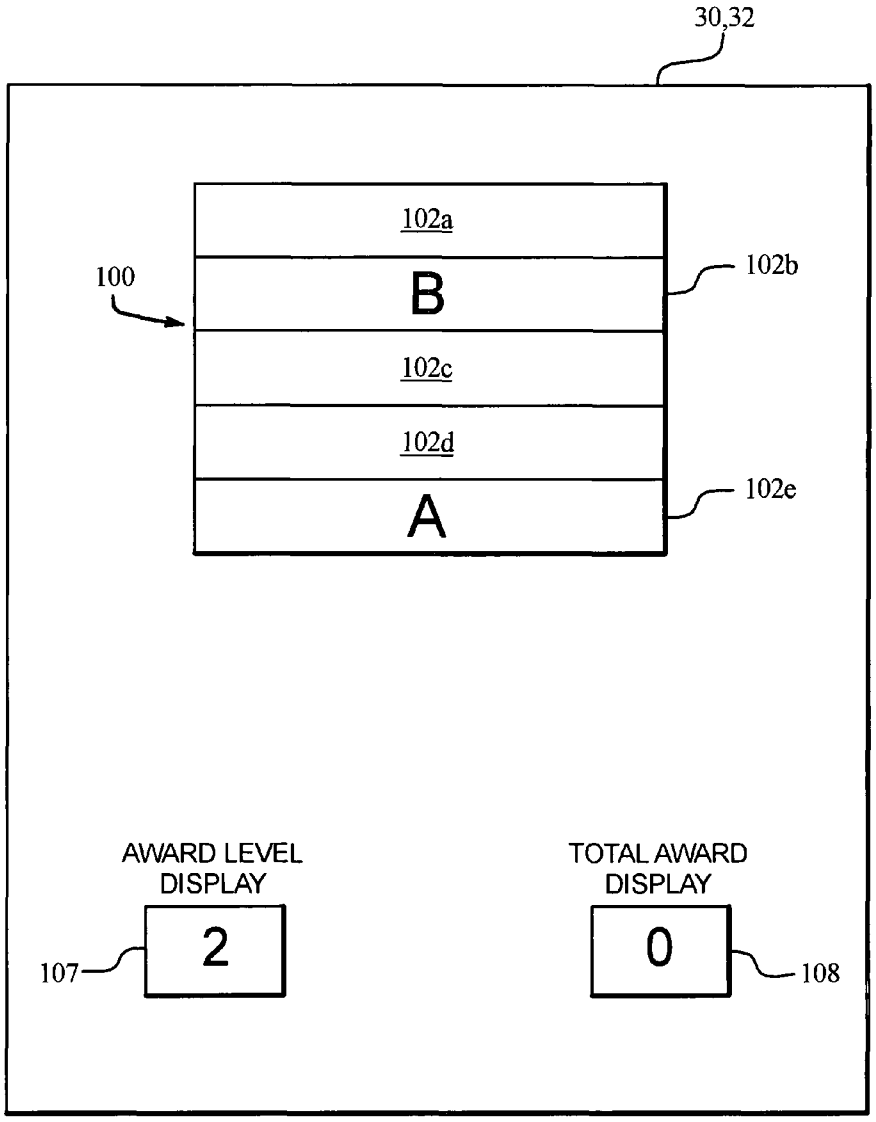

Referring to FIGS. 4A and 4B, an example of the embodiment of FIG. 3 is illustrated where a player enters the competition mode or competition from a game such as a primary game as described above. In the competition mode or competition, the second component selected and revealed by the gaming device is provided to the player. In FIG. 4A, the gaming device or processor randomly determines and reveals component 102*e* (i.e, component A), which is the first component revealed in the game. Therefore, the gaming device picked the component having the least favorable ranking in the game. As indicated in the award level display, the award level in the game is one as shown in the award level display 107. Additionally, the player does not have any awards accumulated in the game as indicated by the total award display 108.

Referring to FIG. 4B, the gaming device randomly determines and reveals a second component, which is component 102*b* or component B. Component B (102*b*) is the second most favorable component in the game. Thus, the rank of the player's component, component B, is more favorable than the rank associated with the first component (i.e., the non-player's component), component A (102*e*). The gaming device therefore advances the award level in a subsequent game because the player's component, is more favorable than the other revealed component in the competition. If the player's component was less favorable than the other revealed component, the award level remains the same in the subsequent game. In this example, the gaming device advances the award level from one to two for the subsequent game as indicated by the award level display 107. The new award level indicated in the award level display 107 will be employed in the subsequent game to determine the award or awards, if any, provided to the player in the subsequent game.

It should be appreciated that the gaming device may advance the award level by increasing the award level by a random amount, a predetermined amount, an amount based on a player's wager, or an amount based on any suitable value, credit value, award value, multiplier value or other suitable value. It should also be appreciated that, in this example, the player did not receive an award associated with the revealed component, as indicated by the total award display 108. However, in another embodiment, a plurality of awards are associated with the components such that the player receives an award associated with the component, which is associated with the picked selection. The award may be any suitable award or awards, such as multipliers, values, credits and multipliers. In this example, once the player wins the competition and receives the advanced award level, the competition ends and the gaming device initiates the subsequent game. It should be appreciated that the gaming device may initiate a subsequent game or games, a bonus game, a sub-game or another competition (to attempt to further increase the award level) after the competition ends.

Figure 5:
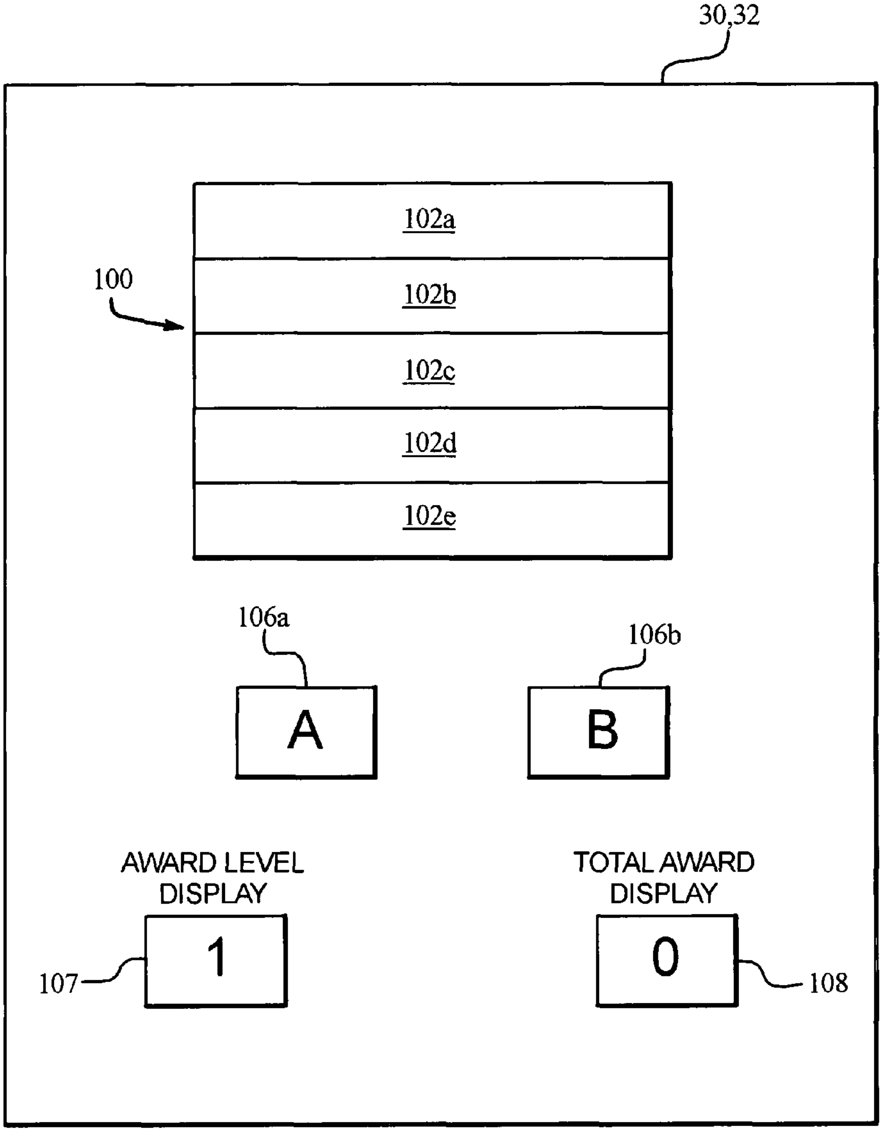
FIG. 5 is an enlarged elevation view of another embodiment of the present invention.

Referring to FIG. 5, in another embodiment of the competition, competition game or competition mode, the gaming device displays five components, 102*a*, 102*b*, 102*c*, 102*d*, and 102*e* to the player. The gaming device also displays at least two selections, such as selections 106*a* and 106*b*. One of the ranked components in display 100 is associated with each of the selections 106*a* and 106*b*. The selections are initially masked or hidden from the player so that the player does not know which component is associated with the selections. It should be appreciated that any suitable number of selections may be employed in accordance with the present invention.

In the competition, the player picks one of the selections to reveal the component associated with the selection. The gaming device picks and reveals the component associated with the unpicked selection. The components associated with the selections 106*a* and 106*b* are compared and the gaming device determines which component has a more favorable ranking. The gaming device then advances the player's award level in a subsequent game when the player picks the selection including the component having the more favorable ranking. If the rank of the component associated with the selection picked by the player is less favorable than the rank of the component associated with the other selection revealed by the gaming device or processor, the game ends and the award level remains unchanged in the subsequent game. An award level display 107 indicates the award level in the game. A total award display 108 indicates the total award, if any, provided to the player in the competition.

Figure 6A:
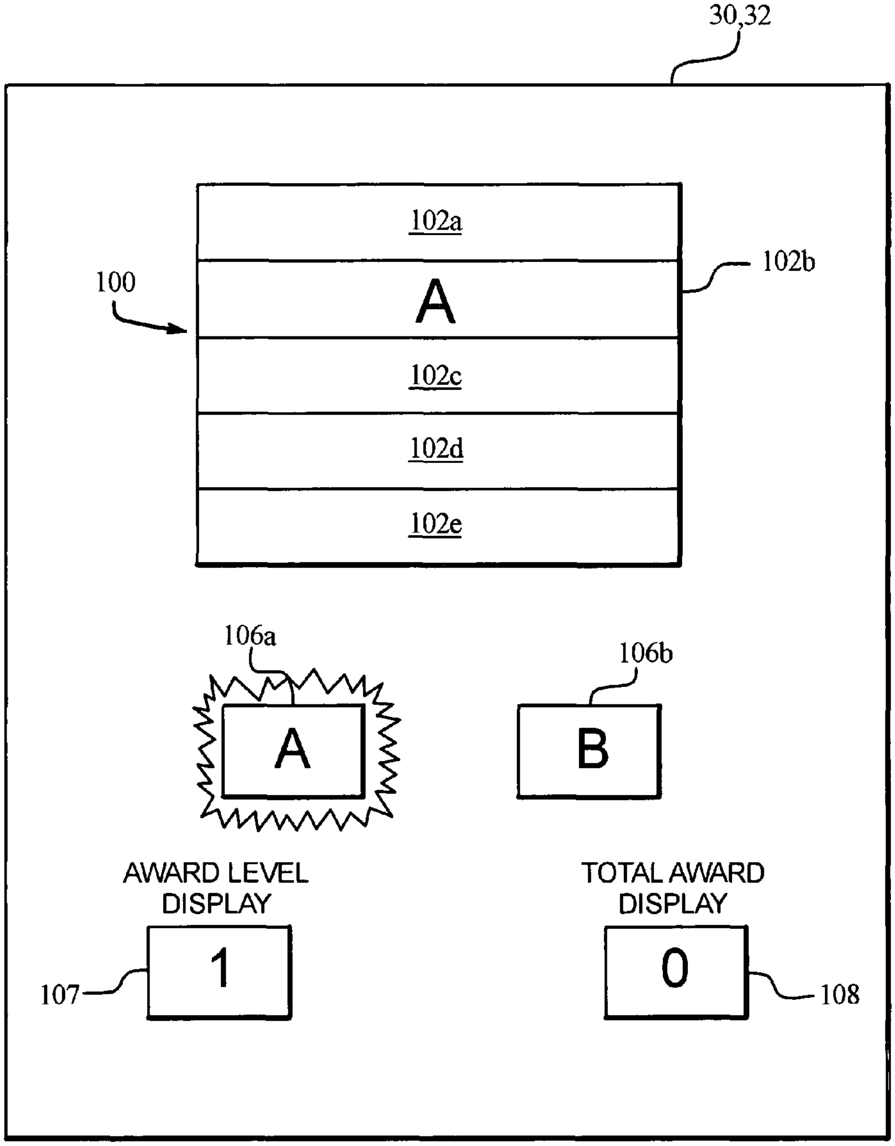
FIGS. 6A and 6B are enlarged elevation views of an example of the embodiment of FIG. 5.
Figure 6B:
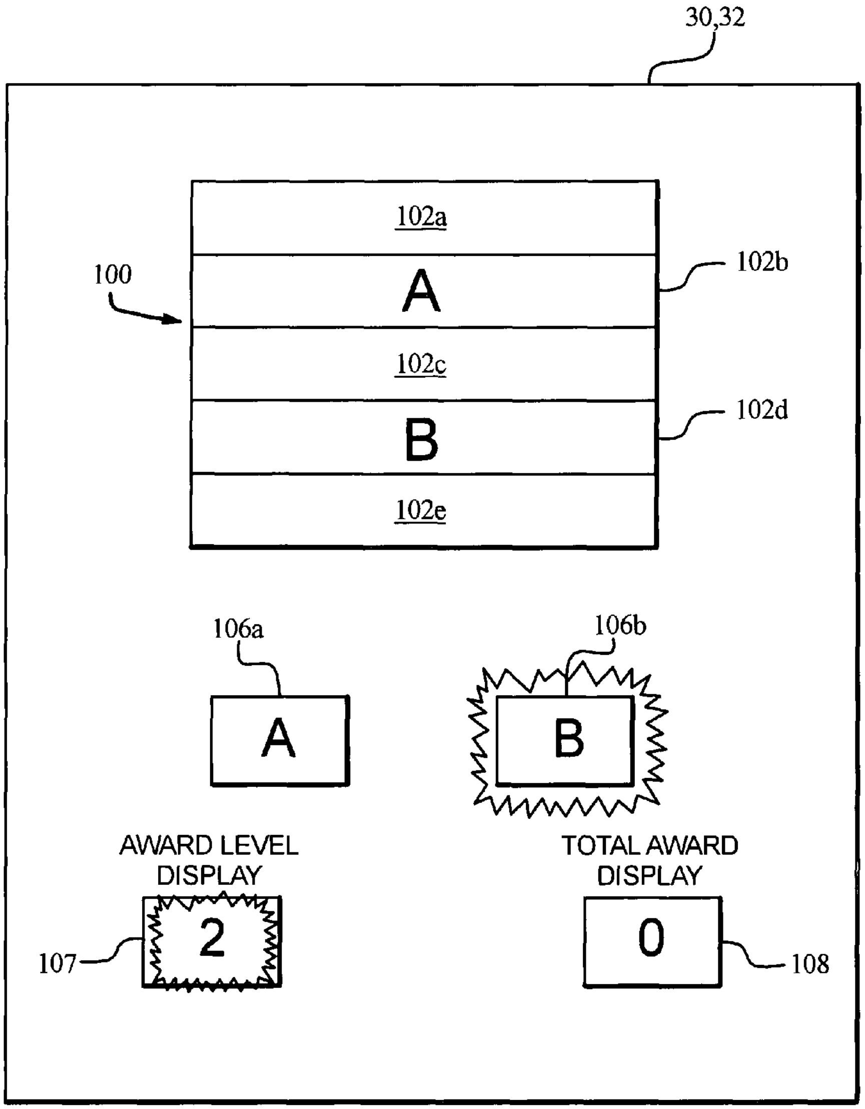

Referring to FIGS. 6A and 6B, an example of the embodiment of FIG. 5 is illustrated where a gaming device initiates the competition mode or competition from another game and enables the player to pick one of two selections displayed to the player in the competition. Each selection 106*a* and 106*b* includes a ranked component 102 displayed in the component display 100. The player's goal to pick the selection 106*a* or 106*b* which includes the component having the most favorable ranking. In this example, the player picks selection 106*a* or A, which reveals component 102*b*. Therefore, the player picks the selection including the component having the second most favorable ranking from the plurality of ranked components 102 in the game. Also as indicated in the award level display, the award level is one as shown in the award level display 107. Additionally, the player does not have any awards accumulated in the game as indicated by the total award display 108.

Referring to FIG. 6B, the gaming device picks and reveals the non-player component or the component associated with the unpicked selection 106*b*. The component 102*d* is associated with the unpicked selection 106*b*. Because the rank of the component 102*d* is less favorable than the rank of component 102*b*, the player wins the competition and the gaming device advances the award level in a subsequent game as indicated by the award level display 107. In this example, the award level increased by one to an award level of two.

It should be appreciated that the award level may advance by increasing the award level by a random amount, a predetermined amount, an amount based on a player's wager, or any amount based on any suitable value, credit value, award value, multiplier value or other suitable value. It should also be appreciated that, in this example, the player did not receive an award associated with the revealed component, as indicated by the total award display 108. However, in another embodiment, a plurality of awards are associated with the components such that the player receives an award associated with the component associated with the picked selection. The award may be any suitable award or awards, such as multipliers, values, credits and multipliers. Once the player wins the competition and the gaming device advances the award level for the subsequent game, the competition ends and the gaming device initiates the subsequent game. It should be appreciated that the gaming device may alternatively initiate a bonus award mode, a bonus game, another competition or any other suitable type of game after the competition ends. It should also be appreciated that the player may or may not obtain an award from the advanced award level, depending on the use of the award level in the subsequent game.

In a further embodiment, the gaming device advances the award level in a subsequent game based on the relationship between the component associated with the selection picked by the player and the component associated with the selection picked by the processor. In this embodiment, the gaming device advances the award level in the subsequent game based on the difference between the rankings of the components associated with the picked selections. For example, in FIG. 6B, the difference between the rankings of the component picked by the player (102*b*) and the ranking of the component picked by the processor (102*d*) is two. Therefore, the gaming device advances the award level by two in the subsequent game.

In another embodiment, the gaming device decreases or reduces the award level in a subsequent game when the rank of the component associated with the selection picked by the player is less favorable than the rank of the component picked by the processor. The award level may be reduced by a predetermined amount, randomly determined amount, based on the difference between the ranks or according to any other suitable method.

Figure 7:
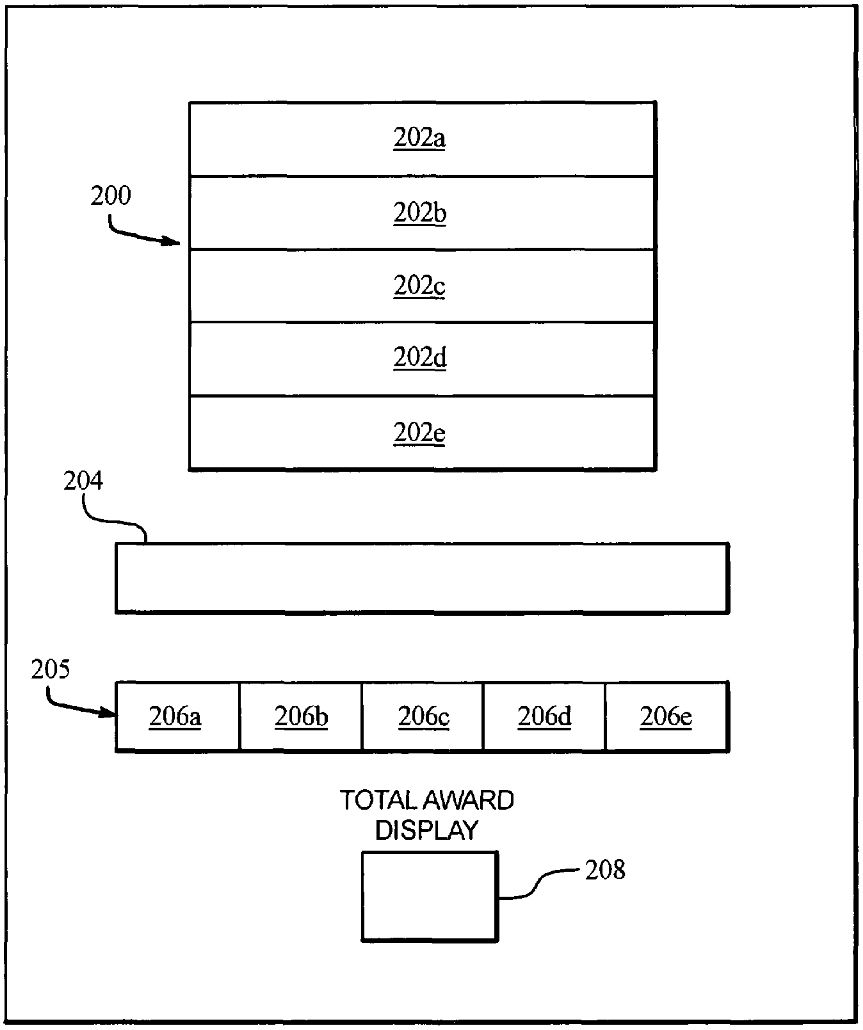
FIG. 7 is an enlarged elevation view of a further embodiment of the present invention.

Referring to FIG. 7, in another embodiment of the present invention, the gaming device includes a query display 204 which displays a query to a player such as a question. A plurality of selections 206*a*, 206*b*, 206*c*, 206*d*, and 206*e*, are associated with the query display 204 where each of the selections includes one of the ranked components 202*a*, 202*b*, 202*c*, 202*d*, and 202*e*, respectively. A total award display 208 indicates the total value of any awards accumulated by the player in the game. At the end of the competition, the player receives the total award displayed in the total award display 208.

In the competition, the processor of the gaming device randomly selects and displays a statement or question to a player in the query display 204. The player then picks one of the selections 206*a*, 206*b*, 206*c*, 206*d*, and 206*e* to reveal one of the components 202*a*, 202*b*, 202*c*, 202*d*, and 202*e* in the component display 200. The processor also picks and reveals one of the unpicked selections to reveal a component in the plurality of ranked components. In this embodiment, component 202*a* has the most favorable ranking and component 202*e* has the least favorable ranking where the components are arranged in the component display based on the values associated with the components. Thus, component 202*a*, which has the greatest value, has the most favorable ranking in the display 200. The remaining components are displayed and ranked in descending order according to the values associated with those components.

If the player picks one of the selections 206, which reveals a component 202 having a more favorable value compared to the value of the component picked by the processor, the player wins the competition and the gaming device advances the award level for a subsequent game. In one embodiment, the player receives the award or value associated with the component picked by the player in the competition. The value is displayed and added to the player's total award indicated in the total award display 208 and the player receives that award at the end of the competition.

Figure 8A:
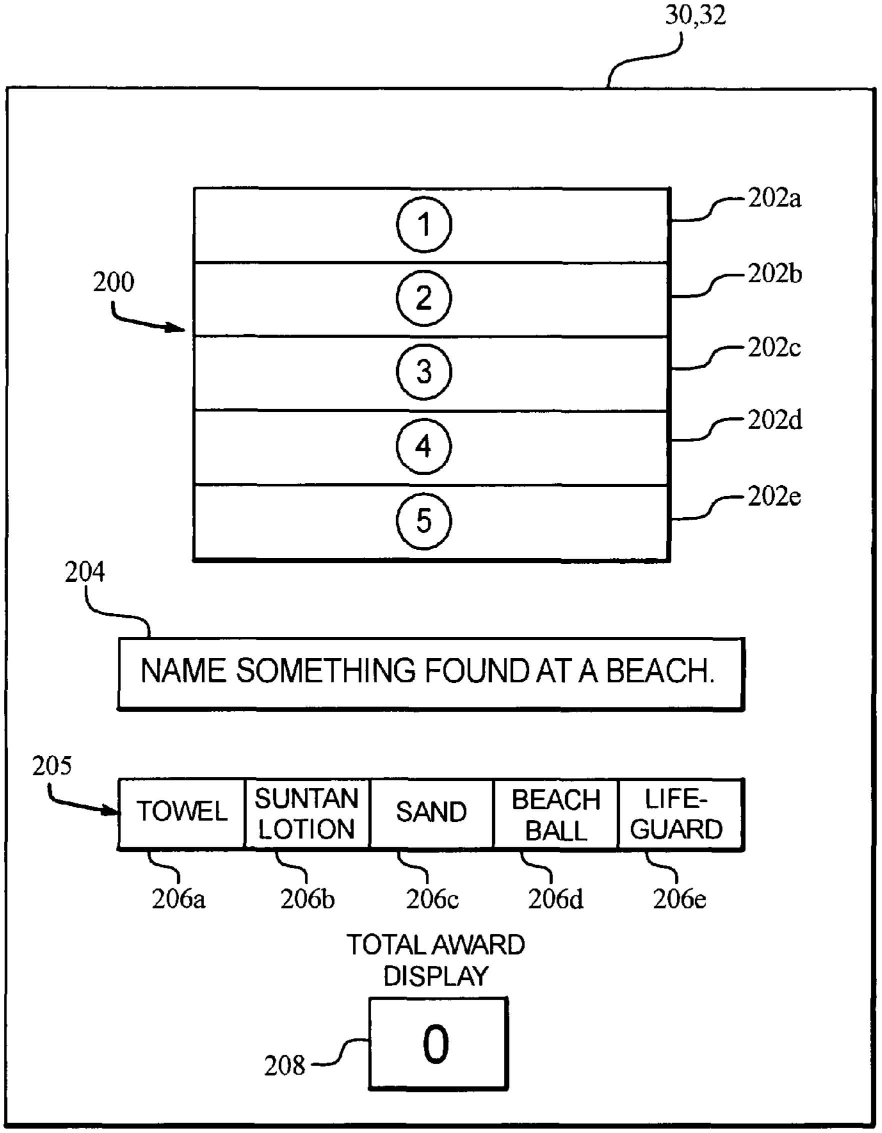
FIGS. 8A, 8B and 8C are enlarged elevation views of an example of the embodiment of FIG. 7.
Figure 8B:
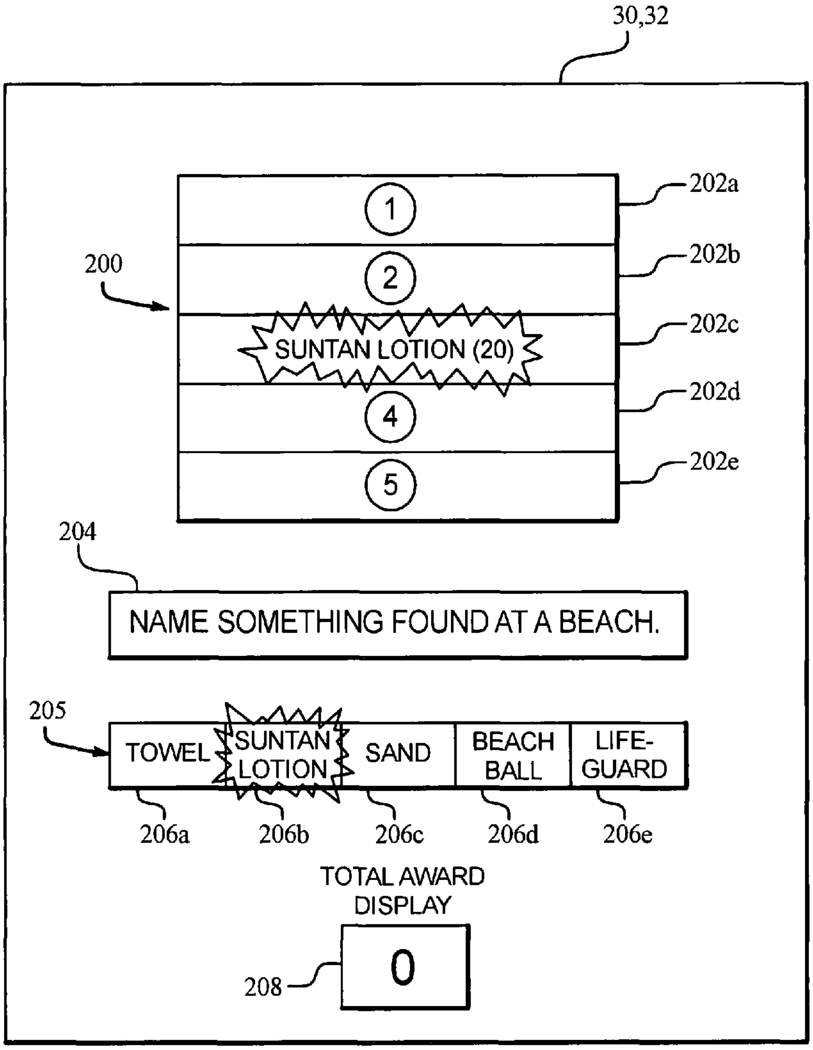
Figure 8C:
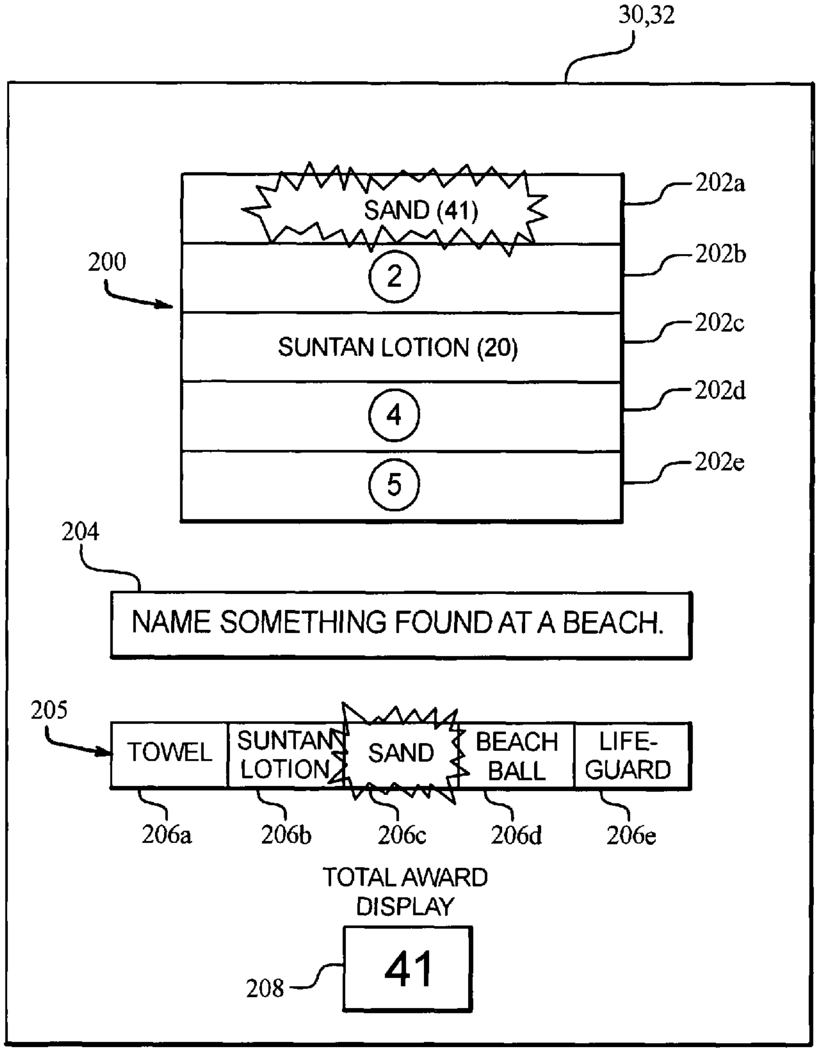

Referring to FIGS. 8A, 8B and 8C, an example of the above embodiment is illustrated where a player competes to advance the award level in a subsequent game. As shown in FIG. 8A, a plurality of components 202*a*, 202*b*, 202*c*, 202*d*, and 202*e* are displayed to the player in a component display 200. In addition, a statement is displayed to the player in a query display 204. The statement in this example, is a statement which has several answers or outcomes associated with it.

Specifically, the statement states "Name Something Found at a Beach." The gaming device also displays several selections 206*a*, 206*b*, 206*c*, 206*d*, and 206*e*, which provide outcomes or answers associated with the statement in the query display 204. The components or answers are arranged in the component display 200 according to the values associated with the components. In this example, the awards or values associated with these components are based on the popularity of the answers associated with the statement. Therefore, the most popular answer or response to the statement will have the greatest value or most favorable ranking, and the least popular answer or outcome related to the statement will have the lowest value or least favorable ranking. If the player picks the component or answer 206 having the more favorable value or rank than the value of the component picked by the processor, the player wins the competition and the gaming device advances the award level in a subsequent game. In one embodiment, the player receives an award which is based on the value associated with the component or answer picked by the player in the competition when the value of the component picked by the player is more favorable or greater than the value of the component picked by the processor. That component or value is added to the total award displayed in the total award display 208.

Referring to FIG. 8B, in the competition the processor picks the component or answer 206*b* which is "suntan lotion." The component display 200 reveals the location of that component in the symbol display 200, which is component 202*c*. This component or answer has a value of twenty associated with it and is the third best choice or answer (is ranked third) in this example. If the player picks and reveals a component or answer that includes a more favorable or greater value, or which is a more popular choice (i.e., has a more favorable ranking) than the answer associated with the processor's pick, the player wins the competition and the gaming device advances the award level in the subsequent game.

Referring to FIG. 8C, the player picks and reveals selection 206*c* which highlights the component or answer "sand." Selection 206*c* includes the best answer to the statement in the game as shown in the component display 200. The answer "sand" or component 202*a* had a value of forty-one and the answer "suntan lotion" had a value of twenty. Thus, the player picked the answer, which had a greater value that the value of the component picked by the processor. In addition, the component picked by the player is the most favorable or highest ranking component in the competition. Therefore, the gaming device advances the award level in a subsequent game. In this example, the player also receives the award or value associated with the picked component 202*a*, which is forty-one. This value is added to the player's total award as indicated in the total award display 208. In one embodiment, the advanced award level received from the competition includes doubling the player's total award after the competition. Therefore, the player's total award becomes eighty-two based on the advanced award level. It should be appreciated that the total award may be doubled, tripled or multiplied by any suitable factor based on the advanced award level. It should also be appreciated that the advanced award level may be any suitable award level in a game. In one such example, the award level is a group of possible awards having a higher average value than another group of awards, as described below.

Figure 9:
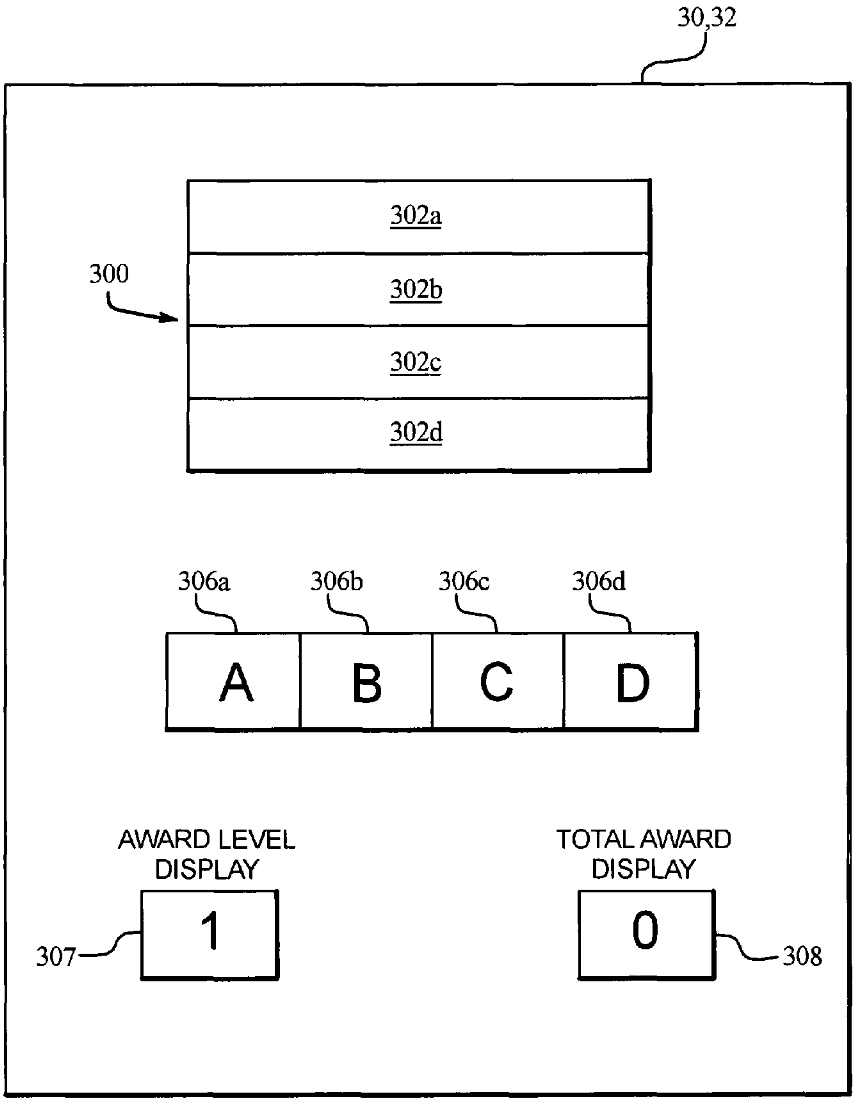
FIG. 9 is an enlarged elevation view of another embodiment of the present invention.

Referring to FIGS. 9, 10A to 10D, another embodiment of the present invention is illustrated where two or more players compete against each other to obtain the component having the most favorable or greatest award or value in the competition and thereby advance the award level in the game for that player. FIG. 9 illustrates an example of this embodiment where the gaming device displays a plurality of components 302*a*, 302*b*, 302*c*, and 302*d* in a component display 300. Each player picks one of the selections 306, which are associated with the ranked components 302*a*, 302*b*, 302*c* and 302*d*.

In this embodiment, the number of ranked components equals the number of selections (i.e., the number of players) in the competition. In another embodiment, the number of ranked components is greater than the number of players in the competition. Similarly, the number of selections may be equal to or greater than the number of players in a competition.

In this example, the number of components and the number of selections equal the number of players in the competition, and each player picks one of the selections 306 to reveal a corresponding ranked component 302 in the component display 300. An award level display 307 indicates the present award level in the game. A total award display indicates the total award or value provided to the player that picks the selection including the highest or most favorable ranking component in the game. At the end of the competition, the player who picks the highest ranking component receives the award or value associated with the component as indicated in the total award display 308.

Figure 10A:
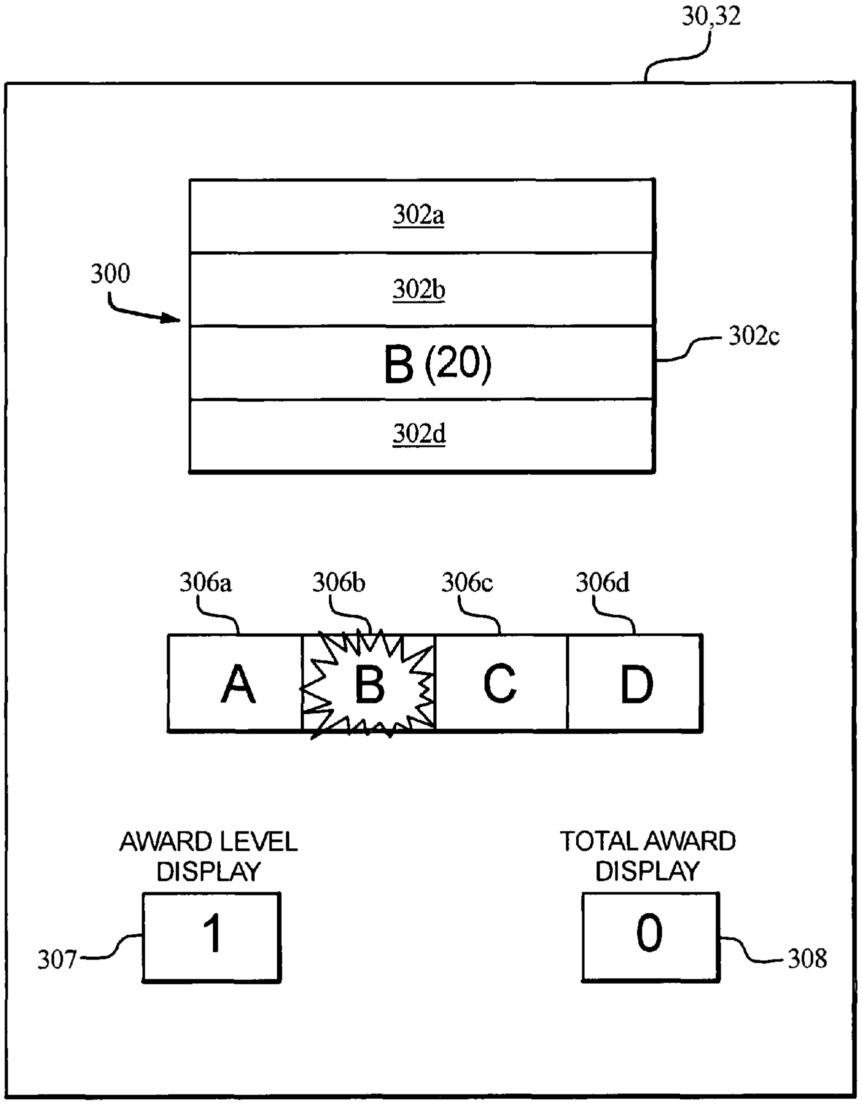
FIGS. 10A, 10B, 10C and 10D are enlarged elevation views of an example of the embodiment of FIG. 9 where several players compete to increase their award levels in a game.

Referring to FIG. 10A, the first player picks selection 306*b* (i.e., B), which is associated with component 302*c* in the component display 300. Component 302*c* includes an award or value of twenty. However, component 302*c* is the third highest or the third ranked component in the component display 300. Therefore, the first player did not pick the highest ranking component in the game. It should be appreciated that the order that the players pick selections in a game may be randomly determined, predetermined or determined in any suitable manner desired by the game implementor.

Figure 10B:
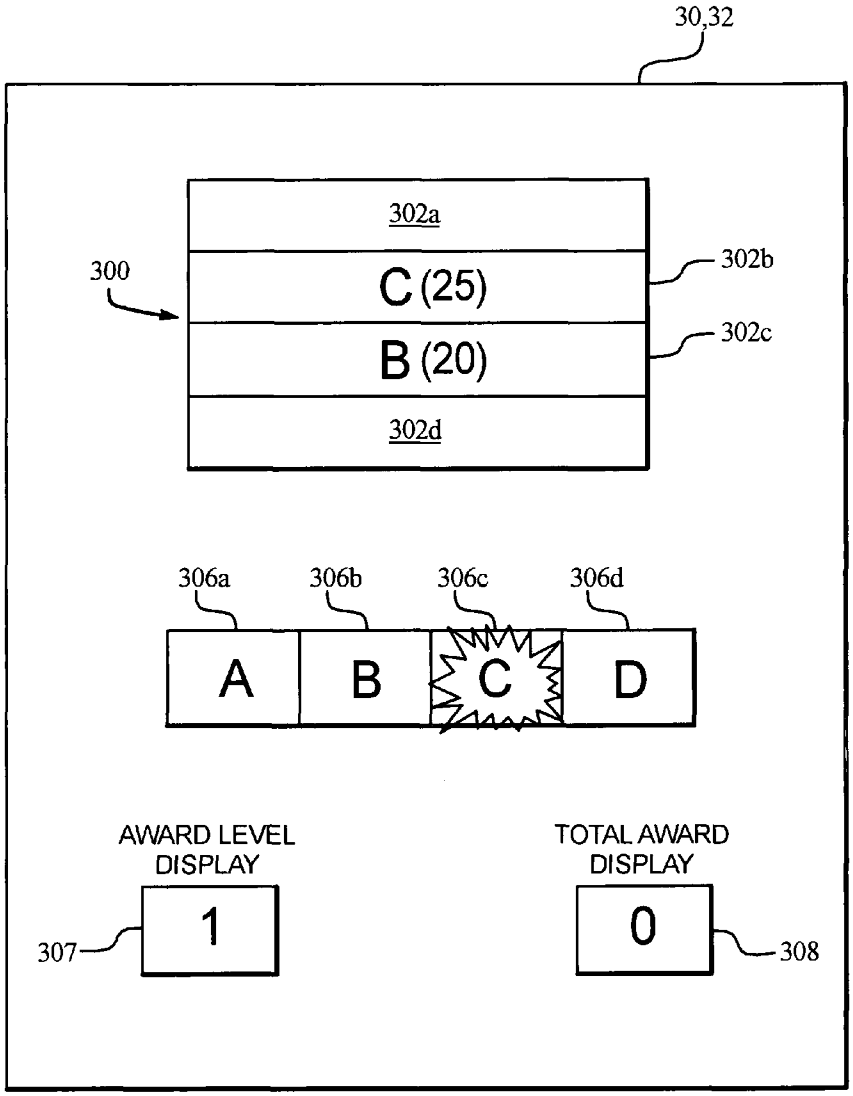

Referring to FIG. 10B, the second player picks selection 306*c* which reveals the second component 302*b* in the component display 300. The second component 302*b* (i.e., C) includes an award or value of twenty-five. This component, however, is the second highest ranking component in the component display 300 and therefore the second player did not pick the highest ranking component in the game. The award level remains at one as indicated in the award level display 307. Similarly, the total award in the game is still zero as indicated by the total award display 308.

Figure 10C:
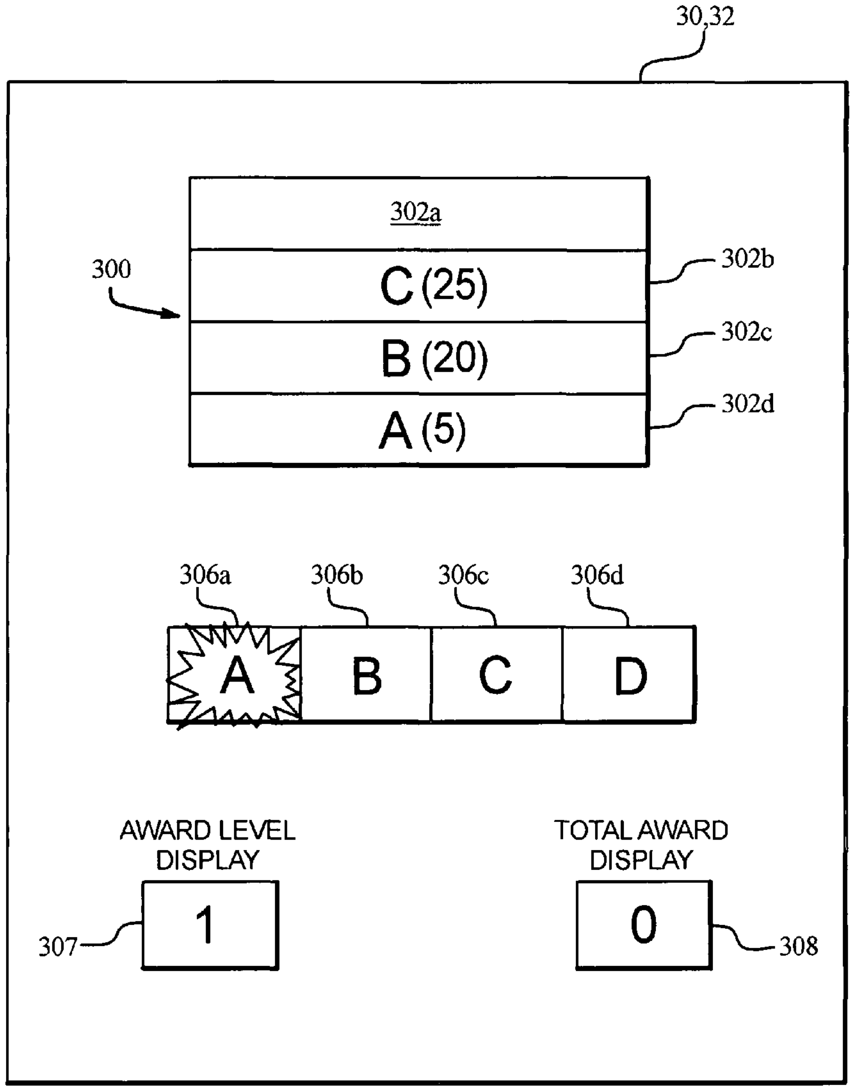

Referring to FIG. 10C, a third player picks one of the two remaining selections, selection 306*a*, which reveals component 302*d* in the component display 300. Component 302*d* (i.e., A) includes an award or value of five. Therefore, component 302*d* is the lowest ranking component in the component display 300. Therefore, the third player did not pick the highest ranking component in the game and therefore did not win the competition. The award level remains at one as indicated in the award display 307. The total award is still zero as indicated in the total award display 308.

Figure 10D:
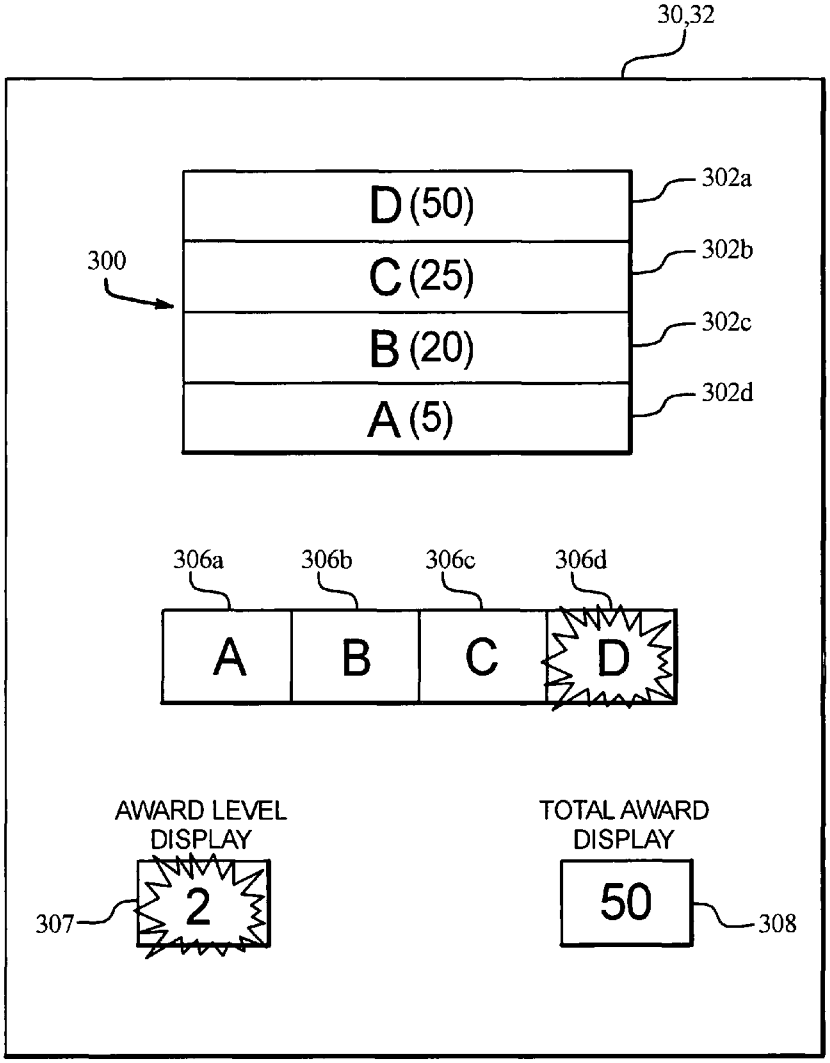

Referring to FIG. 10D, the fourth or last player in the competition picks selection 306*d* which is the only remaining selection in the game. It should be appreciated that the player can pick the final selection or the gaming device may automatically reveal the component associated with the final selection and provide the revealed component to the player. In this example, the selection 306*d* reveals the component 302*a* and the component display 300. Component 302*a* includes an award or value of fifty, which is the highest ranking value in the component display 300. Therefore, the fourth player picked the selection including the highest ranking component in the game. The gaming device provides an increased award level in the game to the fourth player. Thus, the fourth player receives an award level of two as indicated in the award level display 307. The award level for the other three players in the competition remains at one because those players did not win the competition. In one embodiment, the player that picks the selection including the highest ranking component also receives the award or value associated with that component. Therefore, in this example, the fourth player receives the award of fifty associated with the component 302*a*. The award of fifty is indicated in the total award display 308 and provided to the player at the end of the game.

In another embodiment of the multi-player competition described above, the player each pick one of the selections and the components associated with those picked selections are revealed after all of the players pick one of the selections. In one aspect of this embodiment, the components associated with the picked selections are revealed one at a time with the lowest ranking component being revealed first, then the next lowest ranking component until all of the components associated with the picked selections are revealed in order from the lowest ranking component to the highest ranking component. Revealing the components from lowest to highest increases the players' excitement and enjoyment in the competition. It should be appreciated that the components associated with the picked selections may be revealed in any order desired by the game implementor.

In a further embodiment, the award levels are associated with a plurality of award pools or groups wherein each of the award groups includes a plurality of different awards. In one embodiment, the average values of the awards in the award groups are different. In another embodiment, the median of the awards in the award groups are different. In a further embodiment, the awards in one award group are multiples of the awards in one or more other award groups. The gaming device improves the award level in a game or subsequent game based on the awards in the associated award groups. For example, if a player wins a competition by picking the component having the most favorable ranking, then the gaming device advances the award level in a subsequent game based on the award pools or groups associated with the award levels in the subsequent game. Thus, the gaming device may advance the award level based on the average awards associated with one or more previous award levels. Similarly, the gaming device may advance the award level based on the median value of the awards associated with the award groups associated with the previous award level or levels. It should be appreciated that the awards and the award groups may be any suitable awards and/or award groups.

In another embodiment of the multi-player competition, each of the players receives the award or values of the components associated with the selections picked by those players. However, only the player that picked this selection having the highest ranking or most favorable component receives the advanced award level in a subsequent game or games.

Although the embodiments of the present invention are described in relation to a competition initiated from a triggering event occurring in a primary game, it should be appreciated that the competition may be initiated based on a triggering event occurring in a secondary or bonus game, a sub-game or any other suitable game associated with the gaming device.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of input devices;

at least one display device; and at least one processor, said at least one processor programmed to operate with said plurality of input devices and said at least one display device to:

(a) begin a competition upon an occurrence of a competition triggering event, said competition including a plurality of ranked components, each of the plurality of ranked components having a different rank and prior to the beginning of the competition, one of the ranked components being a designated ranked component having a most favorable rank;

(b) display the competition which includes displaying each of a plurality of players randomly achieving a different one of the plurality of ranked components; and (c) for each of the players, cause one of a plurality of different award levels to be employed for determining an award in a subsequent game played by said player, wherein:

(i) when one of the players achieves the designated ranked component having the most favorable rank:

(A) the award level employed for the player that achieved the designated ranked component having the most favorable rank has an average expected award value which is greater than average expected award values of each of the other of the award levels which are employed for determining awards in other subsequent games played by the players that did not achieve the designated ranked component having the most favorable rank; and (B) the award level employed for at least one of the players that did not achieve the designated ranked component having the most favorable rank in the subsequent game played by said at least one of the players remains the same as an award level employed for said at least one of the players for determining an award in a play of a game prior to the competition; and (ii) when no players achieved the designated ranked component having the most favorable rank, the award level employed for each of said players in the subsequent games played by said players remains the same as an award level employed for said players for determining an award in the play of the game prior to the competition.

2. The gaming system of claim 1, wherein the competition triggering event is configured to occur in a play of a primary game operable upon a wager.

3. The gaming system of claim 2, wherein the subsequent game is a secondary game.

4. The gaming system of claim 1, wherein each of said award levels includes a plurality of awards, wherein a plurality of said awards are different.

5. The gaming system of claim 1, wherein the average expected award value of each of said award levels is different.

6. The gaming system of claim 1, wherein each of the ranked components is associated with a different one of the award levels.

7. The gaming system of claim 1, which includes a plurality of awards associated with the ranked components, and wherein said at least one processor is programmed to operate with said plurality of input devices and said at least one display device to provide the awards associated with the designated ranked component having the most favorable rank to the player that achieved the designated ranked component having the most favorable rank.

8. The gaming system of claim 1, which includes a plurality of awards associated with the ranked components, and wherein said at least one processor is programmed to operate with said plurality of input devices and said at least one display device to provide the awards associated with the ranked components achieved by the players to the players that achieved said ranked components.

9. The gaming system of claim 1, wherein the display of the competition includes a display of a query to the players.

10. The gaming system of claim 9, wherein the ranked components represent answers to said query.

11. A gaming system comprising:

a plurality of input devices;

at least one display device; and at least one processor, said at least one processor programmed to operate with said plurality of input devices and said at least one display device to:

(a) begin a competition upon an occurrence of a competition triggering event, said competition including a plurality of ranked components, each of the plurality of ranked components having a different rank and prior to the beginning of the competition, one of the ranked components being a designated ranked component having a most favorable rank;

(b) display the competition which includes:

(i) displaying a plurality of different selections, each of the selections being randomly associated with one of the plurality of ranked components, and (ii) after enabling each of the plurality of players to pick a different one of the displayed selections, displaying the ranked component associated with each selection picked by one of the players, wherein an order of each player's pick does not affect the associated ranked component;

(c) when one of the players picked the selection associated with the designated ranked component having the most favorable rank:

(i) cause a first one of a plurality of different award levels to be employed for determining an award for a subsequent game played by the player who picked the selection associated with the designated ranked component having a most favorable rank, said first one of the award levels having an average expected award value which is greater than average expected award values of each of the other of the award levels; and (i) cause a second one of the award levels to be employed for determining an award for a subsequent game played by one of the players who did not pick the selection associated with the designated ranked component having the most favorable rank, the second one of the award levels remaining the same as an award level employed for said player for determining an award in a play of a game prior to the competition; and (d) when no players picked the selection associated with the designated ranked component having the most favorable rank, the award level employed for each of said players in the subsequent games played by said players remains the same as an award level employed for said players for determining an award in the play of the game prior to the competition.

12. The gaming system of claim 11, wherein the competition triggering event is configured to occur in a play of a primary game operable upon a wager.

13. The gaming system of claim 12, wherein the subsequent game is a secondary game.

14. The gaming system of claim 11, wherein each of said award levels includes a plurality of awards, wherein a plurality of said awards are different.

15. The gaming system of claim 11, wherein the average expected award value of each of said award levels is different.

16. The gaming system of claim 11, wherein each of the ranked components is associated with a different one of the award levels.

17. The gaming system of claim 11, which includes a plurality of awards associated with the ranked components, and wherein said at least one processor is programmed to operate with said plurality of input devices and said at least one display device to provide the awards associated with the designated ranked component having the most favorable rank to the player that picked the selection associated with said ranked component.

18. The gaming system of claim 11, which includes a plurality of awards associated with the ranked components, and wherein said at least one processor is programmed to operate with said plurality of input devices and said at least one display device to provide the awards associated with the ranked components associated with the selections picked by the players to the players that picked the selections associated with said ranked components.

19. The gaming system of claim 11, wherein the display of the competition includes a display of a query to the players.

20. The gaming system of claim 19, wherein the ranked components represent answers to said query.

21. The gaming system of claim 11, wherein a plurality of the other of the award levels are employed for determining awards in other subsequent games played by the players that did not pick the selection associated with the designated ranked component having the most favorable rank.

22. The gaming system of claim 11, wherein each of the award levels is associated with one of the plurality of ranked components.

23. A method of operating a gaming system, said method comprising:

(a) causing at least one processor to execute a plurality of instructions stored in at least one memory device to begin a competition upon an occurrence of a competition triggering event, said competition including a plurality of ranked components, each of the plurality of ranked components having a different rank and prior to the beginning of the competition, one of the ranked components being a designated ranked component having a most favorable rank;

(b) causing the at least one processor to execute the plurality of instructions to operate with at least one display device to display the competition which includes displaying each of a plurality of players randomly achieving a different one of the plurality of ranked components; and (c) for each of the players, causing the at least one processor to execute the plurality of instructions to cause one of a plurality of different award levels to be employed for determining an award in a subsequent game played by said player, wherein:

(i) when one of the players achieves the designated ranked component having the most favorable rank:

(A) the award level employed for the player who achieved the designated ranked component having the most favorable rank has an average expected award value which is greater than average expected award values of each of the other of the award levels which are employed for determining awards in other subsequent games played by the players that did not achieve the designated ranked component having the most favorable rank; and (B) the award level employed for at least one of the players that did not achieve the designated ranked component having the most favorable rank in the subsequent game played by said at least one of the players remains the same as an award level employed for said at least one of the players for determining an award in a play of a game prior to the competition; and (ii) when no players achieved the designated ranked component having the most favorable rank, the award level employed for each of said players in the subsequent games played by said players remains the same as an award level employed for said players for determining an award in the play of the game prior to the competition.

24. The method of claim 23, wherein the competition triggering event is configured to occur in a play of a primary game operable upon a wager.

25. The method of claim 24, wherein the subsequent game is a secondary game.

26. The method of claim 23, wherein each of said award levels includes a plurality of awards, wherein a plurality of said awards are different.

27. The method of claim 23, wherein the average expected award value of each of said award levels is different.

28. The method of claim 23, wherein each of the ranked components is associated with a different one of the award levels.

29. The method of claim 23, wherein a plurality of awards are associated with the ranked components, and which includes causing the at least one processor to execute the plurality of instructions to cause the awards associated with the designated ranked component having the most favorable rank to be provided to the player that achieved said ranked component.

30. The method of claim 23, wherein a plurality of awards are associated with the ranked components, and which includes causing the at least one processor to execute the plurality of instructions to cause the awards associated with the ranked components achieved by the players to be provided to the players that achieved said ranked components.

31. The method of claim 23, wherein causing the at least one processor to execute the plurality of instructions to operate with the at least one display device to display the competition includes causing the at least one processor to execute the plurality of instructions to operate with the at least one display device to display a query to the players.

32. The method of claim 31, wherein the ranked components represent answers to said query.

33. The method of claim 23, which is provided through a data network.

34. The method of claim 33, wherein the data network is an internet.

35. A method of operating a gaming system, said method comprising:

(a) causing at least one processor to execute a plurality of instructions stored in at least one memory device to begin a competition upon an occurrence of a competition triggering event, said competition including a plurality of ranked components, each of the plurality of ranked components having a different rank and prior to the beginning of the competition, one of the ranked components being a designated ranked component having a most favorable rank;

(b) causing the at least one processor to execute the plurality of instructions to operate with at least one display device to display the competition which includes:

(i) displaying a plurality of different selections, each of the selections being randomly associated with one of the plurality of ranked components, and (ii) after enabling each of the plurality of players to pick a different one of the displayed selections, displaying the ranked component associated with each selection picked by one of the players, wherein an order of each player's pick does not affect the associated ranked component;

(c) when one of the players picked the selection associated with the designated ranked component having the most favorable rank:

(A) causing the at least one processor to execute the plurality of instructions to cause a first one of a plurality of different award levels to be employed for determining an award for a subsequent game for the player who picked the selection associated with the designated ranked component having a most favorable rank, said first one of the award levels having an average expected award value which is greater than average expected award values of each of the other of the award levels; and (B) causing the at least one processor to execute the plurality of instructions to cause a second one of the award levels to be employed for determining an award for a subsequent game played by one of the players who did not pick the selection associated with the designated ranked component having the most favorable rank, the second one of the award levels remaining the same as an award level employed for said player for determining an award in a play of a game prior to the competition; and (d) when no players picked the selection associated with the designated ranked component having the most favorable rank, the award level employed for each of said players in the subsequent games played by said players remains the same as an award level employed for said players for determining an award in the play of the game prior to the competition.

36. The method of claim 35, wherein the competition triggering event is configured to occur in a play of a primary game operable upon a wager.

37. The method of claim 36, wherein the subsequent game is a secondary game.

38. The method of claim 35, wherein each of said award levels includes a plurality of awards, wherein a plurality of said awards are different.

39. The method of claim 35, wherein the average expected award value of each of said award levels is different.

40. The method of claim 35, wherein each of the ranked components is associated with a different one of the award levels.

41. The method of claim 35, wherein a plurality of awards are associated with the ranked components, and which includes causing the at least one processor to execute the plurality of instructions to cause the awards associated with the designated ranked component having the most favorable rank to be provided to the player that picked the selection associated with said ranked component.

42. The method of claim 35, wherein a plurality of awards are associated with the ranked components, and which includes causing the at least one processor to execute the plurality of instructions to cause the awards associated with the ranked components associated with the selections picked by the players to be provided to the players that picked the selections including said ranked components.

43. The method of claim 35, wherein causing the at least one processor to execute the plurality of instructions to operate with the at least one display device to display the competition includes causing the at least one processor to execute the plurality of instructions to operate with the at least one display device to display a query to the players.

44. The method of claim 43, wherein the ranked components represent answers to said query.

45. The method of claim 35, which includes causing the at least one processor to execute the plurality of instructions to cause a plurality of the other of the award levels to be employed for determining awards in other subsequent games played by the players that did not pick the selection associated with the designated ranked component having the most favorable rank.

46. The method of claim 35, wherein each of the award levels is associated with one of a plurality of ranked components.

47. The method of claim 35, which is provided through a data network.

48. The method of claim 47, wherein the data network is an internet.

* * * * *

UNITED STATES PATENT AND TRADEMARK OFFICE

CERTIFICATE OF CORRECTION

PATENT NO. : 8,777,712 B2
APPLICATION NO. : 11/724925
DATED : July 15, 2014
INVENTOR(S) : Anthony J. Baerlocher It is certified that error appears in the above-identified patent and that said Letters Patent is hereby corrected as shown below:

IN THE CLAIMS

In Claim 11, Column 15, Line 53, replace "a" with --the--.
In Claim 11, Column 15, Line 56, replace "(i)" with --(ii)--.
In Claim 35, Column 18, Line 30, replace "a" with --the--.

Signed and Sealed this
Fifth Day of April, 2016

Michelle K. Lee

Michelle K. Lee
*Director of the United States Patent and Trademark Office*